Patented Aug. 31, 1937

2,091,740

UNITED STATES PATENT OFFICE 2,091,740

SUBSTANCE FOR STOPPING RUNS IN HOSE

James L. Powell, Norfolk, Va.

No Drawing. Application April 20, 1936,
Serial No. 75,505

5 Claims. (Cl. 134—26)

My invention relates generally to means to be applied to hose, particularly silk hose, to stop and prevent runs therein, and particularly to a solution adapted to be applied to the hose at the head of the run to prevent further running, and an important object of the invention is to provide a solution of this character which can be easily and quickly applied and used, even while the hose is being worn.

Another important object of my invention is to provide a solution of the character indicated which is substantially colorless when dry on the hose, and which makes a practically invisible repair.

Another important object of my invention is to provide a solution of the character indicated above which dries practically instantly upon application, and which may be carried about by the wearer of the hose so as to be instantly available.

Other important objects of my invention will be apparent from a reading of the following description in connection with the example given, wherein for purposes of illustration I have set forth a preferred embodiment of my invention.

An efficient and practical solution for use in repairing and stopping runs in hose, particularly in ladies' silk hose, must be capable of being easily and conveniently applied, must dry quickly, and must be substantially colorless and invisible when dry, and must make a permanent repair. Present substances of this general character lack one or more of the features mentioned, whereas the present invention possesses all of these features in desirable degrees.

The substance of the present invention contains exclusively, rosin, gum dammar, carbon disulphide, and carbon tetrachloride.

Although both the rosin and gum dammar are resins, both must be used in accordance with the present invention, because I have discovered that rosin alone is too weak, and gum dammar alone is too heavy and leaves a too dark mark on the hose.

The quick drying of the solution is produced by the carbon disulphide which also acts as a solvent for the rosin and gum dammar, but carbon disulphide does not form a perfectly clear solution. The carbon tetrachloride is added to augment the purposes of the carbon disulphide and in addition to produce a clarification of the solution, without in any way destroying the drying properties of the solution. The solution in its final form is a clear light yellow color which dries practically invisible on the hose. When applied to the hose, the solution is carried into the threads and fibers of the hose and then immediately evaporates, so as to leave a light coating of rosin and dammar gum on the hose, which is practically invisible.

Although the mentioned ingredients of the solution of the present invention may be brought together in any suitable order, they must be mixed in certain relative proportions, and these proportions must be maintained with reasonable exactness in the preparation of the solution.

If a stronger and darker solution is wanted more rosin and dammar gum may be utilized, but the proportion and relation between the dammar gum and the rosin must be maintained. If the solution is to be made weaker and lighter in color, more carbon disulphide and carbon tetrachloride is added, but the carbon disulphide and the carbon tetrachloride must be maintained in the same relative proportions.

One commercially important feature of the present invention is that the same may be prepared by the most simple and inexpensive means, since the ingredients may be placed together in any order found convenient.

I have found that a simple and efficient method of preparing the substance of the invention is as follows:—

Place in a clean vessel 5 c. c. of carbon disulphide and to this add 10 grains of rosin, and permit to stand covered until the rosin is thoroughly dissolved.

Then add 10 grains of dammar gum to the resultant of the foregoing and permit this to stand covered until the dammar gum is completely dissolved.

Then add to the resultant of the foregoing steps 5 c. c. of carbon tetrachloride.

Thereby is formed a solution in accordance with the present invention which contains:—

Carbon disulphide_____cubic centimeters__ 5
Rosin _____grains__ 10
Dammar gum_____do____ 10
Carbon tetrachloride____cubic centimeters__ 5

As stated above, in the event of any variation to secure lighter or darker conditions of the final product, the relative proportioning of the gum dammar and rosin must be maintained, as well as the relative proportioning of the carbon disulphide and carbon tetrachloride, in the event the quantity of either of these groups is increased or decreased.

Although I have shown and described herein a preferred embodiment of my invention, it is to be definitely understood that I do not desire to limit the application of the invention thereto, and any change or changes may be made in the materials, and in the manner of assembling the same, within the spirit of the invention and the scope of the subjoined claims.

What is claimed is:—

1. A solution of the character described, said solution containing exclusively carbon disulphide, rosin, gum dammar, and carbon tetrachloride, the rosin and gum dammar being present in substantially equal proportions.

2. A solution of the character described, said solution comprising the resultant of a mixture of carbon disulphide, rosin, gum dammar, and carbon tetrachloride exclusively, the rosin and gum dammar being present in substantially equal proportions.

3. A substance of the character described comprising the resultant of a mixture of approximately 5 c. c. of carbon disulphide, 10 grains of rosin, 10 grains of gum dammar, and 5 c. c. of carbon tetrachloride.

4. A method of treating a stocking, said method comprising applying to the stocking a quantity of the resultant of a mixture of carbon disulphide, rosin, gum dammar and carbon tetrachloride, said rosin and said gum dammar being present in substantially equal proportions.

5. A method of treating a stocking, said method comprising applying to the stocking a quantity of a substance consisting of carbon disulphide, rosin, gum dammar, and carbon tetrachloride, said rosin and gum dammar being present in substantially equal proportions.

JAMES L. POWELL.